March 23, 1965 W. R. BLACK 3,174,161
HOSPITAL BED
Filed May 8, 1961 9 Sheets-Sheet 1

INVENTOR
Warren R. Black
WITNESS BY
Harry S. Brown Jr. John S. Braddock
ATTORNEY

March 23, 1965    W. R. BLACK    3,174,161
HOSPITAL BED
Filed May 8, 1961    9 Sheets-Sheet 2

INVENTOR
Warren R. Black

WITNESS
Harry S. Brown Jr.

BY
John S. Braddock
ATTORNEY

March 23, 1965 W. R. BLACK 3,174,161
HOSPITAL BED

Filed May 8, 1961 9 Sheets-Sheet 7

INVENTOR
Warren R. Black

WITNESS
Harry S. Brown Jr.

BY
John E. Braddock
ATTORNEY

March 23, 1965 W. R. BLACK 3,174,161
HOSPITAL BED
Filed May 8, 1961 9 Sheets-Sheet 8

INVENTOR
Warren R. Black

WITNESS
Harry S. Brown Jr.

BY John S. Braddock
ATTORNEY

March 23, 1965 W. R. BLACK 3,174,161
HOSPITAL BED
Filed May 8, 1961 9 Sheets-Sheet 9

Fig. 50

INVENTOR
Warren R. Black
BY John S. Braddock
ATTORNEY

WITNESS
Harry S. Brown Jr.

United States Patent Office 3,174,161
Patented Mar. 23, 1965

1

3,174,161
HOSPITAL BED
Warren R. Black, Grand Rapids, Mich., assignor to American Seating Company, Grand Rapids, Mich., a corporation of New Jersey
Filed May 8, 1961, Ser. No. 108,495
7 Claims. (Cl. 5—68)

The present invention relates to motorized hospital beds.

The primary objects of the invention are to provide a hospital bed having power-driven means for separately adjusting the height of the bed, the inclination of the head section of the bed, and the angular disposition of the jointed knee assembly, i.e. the thigh and foot sections of the bed; to provide such a bed which can be fully operated by the patient occupying the bed through the medium of a hand-held, push button, manual control device, thus to relieve nursing personnel from the time-consuming duty of making such bed adjustments; to provide in such a bed means whereby adjustment of the head section and/or the knee assembly can be "locked-out" from the patient's manual control in instances when this is advisable; to provide a bed in which many combinations of motorized and manual adjustments can be made so that the bed can be placed in all vital comfort and treatment positions and in the most efficient working positions for nurses; to provide such a bed in which the power-driven means for adjusting the bed and its parts operate on 110-volt current, whereas the patient control means operate on low-voltage current as a safety precaution; to provide a bed in which adjustments of the bed height, the head section, and the knee assembly are effected by three separate motors, thus eliminating the need for clutches and complicated gearing, and thus making for increased simplicity, more efficiency and greater reliability; to provide such a bed in which all need of limit switches had been eliminated; to provide a bed which may be extended by about 6 inches beyond the length of conventional hospital beds; to provide a bed in which the vertically adjustable supporting pedestals are spaced inwardly from the sides and ends of the bed to give more footroom for attendants; to provide a bed having a low footboard and a removable headboard thus to provide access to the patient from all four sides of the bed; to provide a bed in which provision is made for the attachment of various types of equipment such as side guard rails, overbed table, intravenous standards, fracture equipment, etc., to provide a bed which is improved in other respects hereinafter appearing; and in general to provide a bed which is quiet and efficient in operation, reasonably economical in manufacture and attractive in appearance.

Illustrative embodiments of the invention are shown in the accompanying drawings, wherein:

FIGURE 5 is a side elevation with the head section inclined rearwardly-upwardly and with the knee assembly

2 elevated, the thigh section being inclined forwardly-upwardly and the foot section being inclined forwardly-downwardly from the thigh section;

FIGURE 26 is a perspective view of one of the roller elements of the mechanism, per se;

Referring now in detail to these drawings, the motorized hospital bed there shown generally comprises a horizontally disposed rectangular base frame 51 mounted for raising and lowering movements on four supporting pedestals 52 having casters 53, side plates 54 rigidly connected to and extending upwardly from the middles of the opposite side rails 55 of the base frame 51, a fixed seat spring section 56 extending between the upper ends of the side plates 54, a head spring section 57 pivotally connect at its forward end to the side plates 54, and a knee assembly comprising a thigh spring section 58 pivotally connected at the rearward end to the side plates and a foot spring section 59 pivotally connected at its rearward end to the thigh spring section 58. A unitary mattress 60 is disposed over the head, seat, thigh and foot spring sections in the bed.

Figure 11:
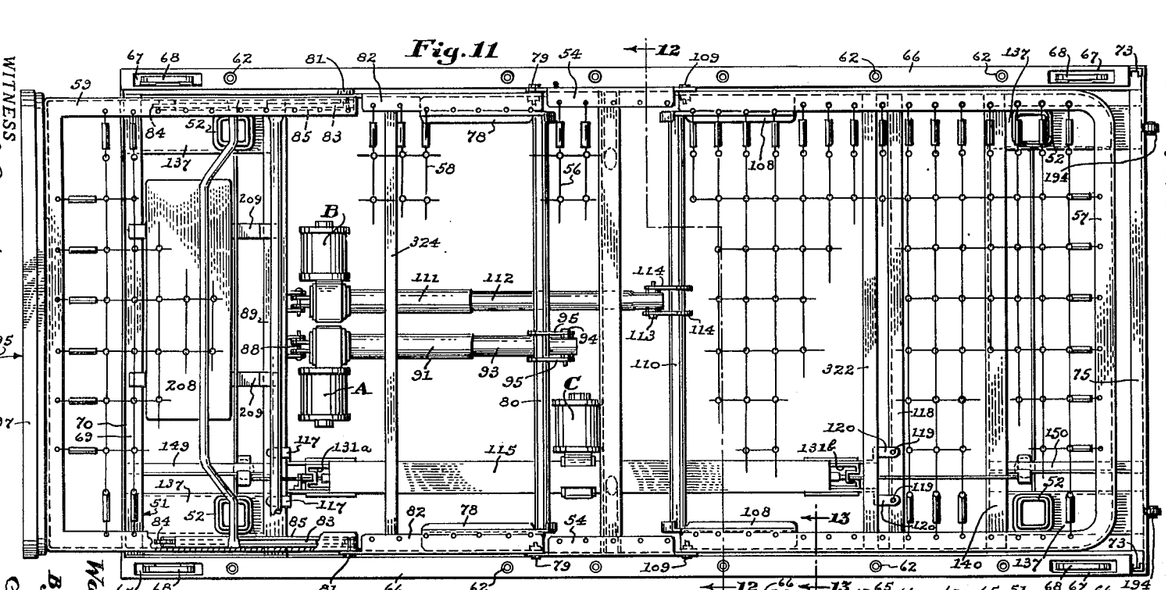
FIGURE 11 is a top plan view of the bed with the mattress removed and with some of its supporting spring webbing broken away to better show the understructure.
Figure 12:
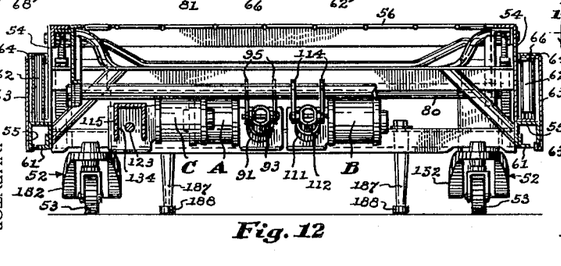
FIGURE 12 is a vertical sectional view of the same taken on line 12—12 of FIGURE 11, with the bed frame in fully lowered position on its supports.
Figures 13, 14, 15, 16, 17:
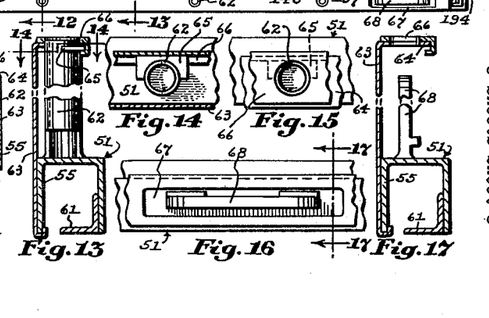
FIGURE 13 is an enlarged fragmentary vertical sectional view taken on line 13—13 of FIGURE 11.
FIGURE 14 is a fragmentary horizontal sectional view taken on line 14—14 of FIGURE 13.
FIGURE 15 is a fragmentary top plan view of parts shown in FIGURE 13.
FIGURE 16 is an enlarged fragmentary top plan view of certain parts of the bed frame also seen at the lower right hand corner of FIGURE 11.
FIGURE 17 is a fragmentary vertical sectional view taken on line 17—17 of FIGURE 16.

The side rails 55 of the base frame 51 are of downwardly opening channel bar construction, and they may have secured therein angle bar runners 61 (see FIGURES 12, 13 and 17) for the accommodation of rollers on a movable overbed table structure (not shown). Short tubular members 62 are secured at intervals, as by welding, to the upper web portions of the channel bar side rails 55 and extend upwardly from said side rails. Side panels 63, which are desirably fabricated from decorative vinyl-clad steel, are secured as by welding to the outer flanges of the side rails 55 and extend upwardly therefrom. The upper marginal edges 64 of the side panels 63 are turned inwardly and are welded to brackets 65 which in turn are welded to the tubes 62 near the latter's upper ends. Decorative strips 66, desirably of aluminum, are secured to the upper surfaces of the side panels' upper marginal edges 64 and having their inner edges curled downwardly and then outwardly around the brackets 65 (see FIGURES 12, 13 and 14). The aluminum strips 66 and the side panels' upper marginal edges 64 have circular apertures therethrough which register with the open upper ends of the short tubular members 62, and these members 62 serve as sockets for the reception of post elements of various accessory equipment such as intravenous standards and side guard rails (not shown). At the ends of the aluminum strips 66 and the side panels' upper marginal edges 64 there are provided elongated rectangular apertures 67 (see FIGURES 11, 16 and 17) which register with upstanding post members 68 welded to the side rails 55. The post members 68 are provided for the attachment of traction devices or other equipment (also not shown).

Figure 3:
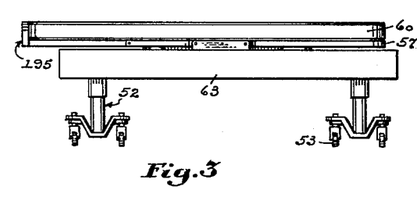
FIGURE 3 is a side elevational view of the bed with the headboard removed therefrom.

The end rails of the rectangular base frame 51 are of angle bar construction. To the foot end rail 69 there is secured a steel end panel 70 which may be vinyl-clad to match the side panels 63 but which is of lesser height than the side panels. The side panels 63 are turned inwardly at the foot of the bed around upright angle bars 71 and are secured thereto as by means of rivets 72, the angle bars 71 being secured as by welding to the side rails 55 of the base frame 51. At the head end of the bed, the side panels 63 are turned inwardly around and are riveted to upright inwardly opening channel bars 73 secured as by welding to the side rails 55. A headboard 74, which may also be fabricated of matching vinyl-clad steel, is inserted in the grooves of the inwardly opening upright channel bars 73, and it will be seen that this headboard 74 is readily removable as seen in FIGURE 3 thus to give access to the patient from the head end of the bed. When in position on the bed, the headboard 74 rests on the head end rail 75 of the base frame 51.

Figure 5:
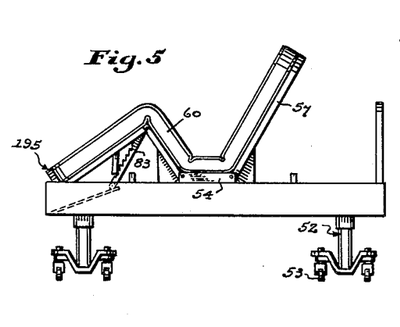

Three reversible electric gear-motors are provided for effecting movements of the bed and its various parts. There is a gear-motor A for moving the knee assembly, i.e. the tigh and foot spring sections 58 and 59 of the bed between their horizontal positions seen in FIGURE 3 and their extreme angularly elevated positions seen in FIGURE 5. A second gear-motor B is provided for moving the head spring section 57 between its horizontal position seen in FIGURE 3 and its extreme angularly elevated position also seen in FIGURE 5. The third gear-motor C moves the entire bed up or down on its supporting pedestals 52 between an extreme low position wherein the top of a 6 inch thick bed mattress is approximately 21½ inches from the floor and an extreme high position approximately 35 inches from the floor. It is pointed out that the provision of three separate gear-motors for performing these three functions eliminates the necessity of complicated clutches and other gearing present in earlier motorized beds, thus making for greater simplicity and reliability, and longer life of the operating parts.

Figures 1, 1A, 2:
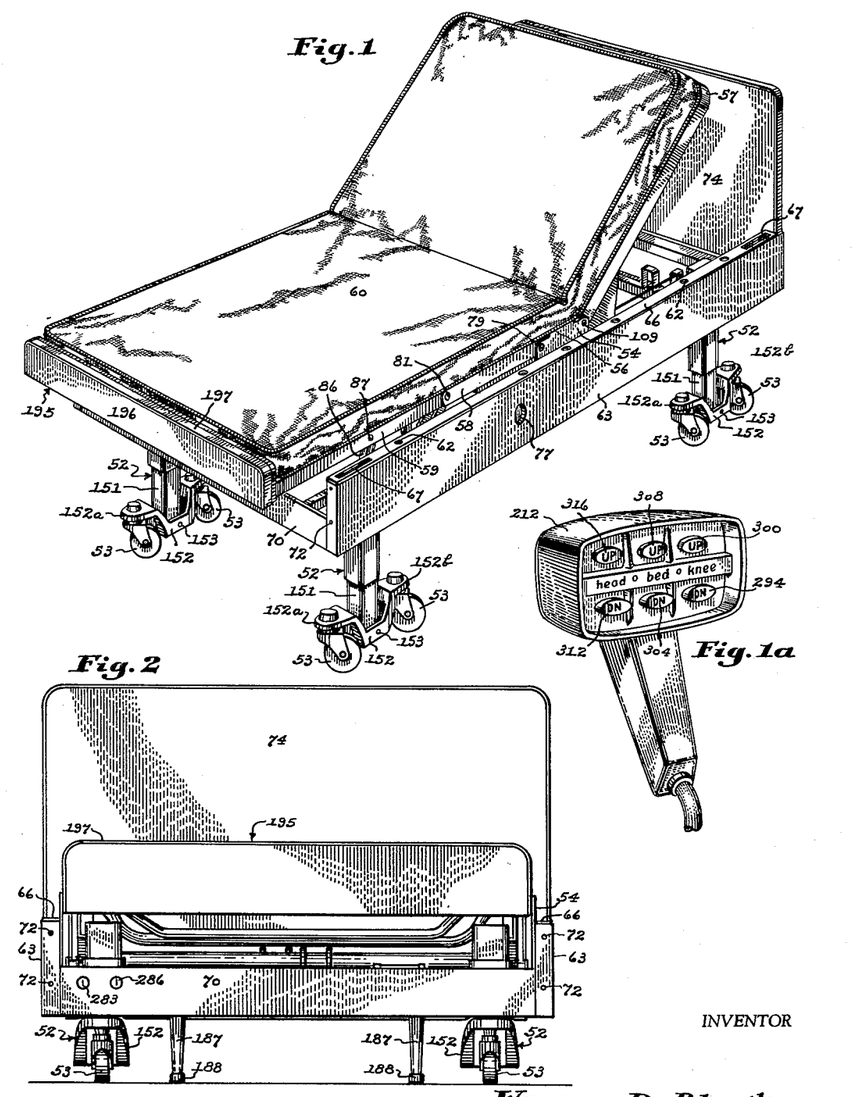
FIGURE 1 is a perspective view of the new hospital bed with its base frame shown in fully elevated position on its supporting pedestals, and the head section shown in upwardly inclined position.
FIGURE 1a is a perspective view of a manual control device for operating the bed.
FIGURE 2 is a foot end elevational view of the bed, with the bed frame shown in fully lowered position on its supporting pedestals.

The gear-motors may be actuated by means of a manual control device having six push-buttons—an Up-button and a Down-button for each gear-motor, and thus the bed can be operated by either the patient himself or by an attendant. Such a manual control device is illustrated in FIGURE 1a, and provision is made in the bed for a suitable socket to be installed in a bracket 76 into which the device would be plugged through an aperture 77 in the side wall of the bed. The operation of the manual control device is fully described hereinafter in connection with the wiring diagram in FIGURE 50.

The functions of the three gear-motors and the operating parts associated with them are separately described below in the order in which given above.

*Gear-motor A—thigh and foot spring sections*

The mechanism for operating the thigh and foot spring sections of the bed is best seen in FIGURES 11, 12 and 19–26. The thigh spring section 58 is mounted on brackets 78 which are pivotally connected at 79 to the side plates 54, and the brackets 78 are connected by a tubular crossbar 80. The foot spring section 59 has its rearward end pivotally connected at 81 to forward extensions 82 on the brackets 78, and arms 83 which are also connected to the pivotal connections at 81 extend forwardly-downwardly therefrom and have rollers 84 which ride up and down in tracks 85 mounted on the base frame 51. Other arms 86 are pivotally connected at 87 to the foot spring section 59 and extend forwardly-downwardly into selected teeth in the toothed upper edges of the arms 83 to support the foot spring section 59 at the front.

Referring now particularly to FIGURES 20–26, a gear-motor A is pivotally mounted at 88 on an angle bar 89 extending transversely across the base frame 51 and secured thereto as by welding. This gear-motor A drives a screw 90 within a tubular sheath 91 secured to the gear-motor, which screw in turn advances or retracts a travelling nut 92 thereon which is secured within the forward end of a smaller tubular connecting member 93 which slidingly telescopes into the larger tube 91. The rearward end of the tubular connecting member 93 is pivotally connected at 94 to depending arms 95 which are rigidly mounted on the tubular crossbar 80. The tube 93 is slotted as shown at 96 (see FIGURES 20–21) for a purpose to be hereinafter described. The screw 90 is coupled at its forward end to the driving shaft 97 of the gear-motor A by means of a coupling 98 (see FIGURE 21), and the rearward end of the screw 90 has an annulus 99 secured thereon which centers the screw in the tubes 91 and 93 and which rides in the smaller tube 93 during the latter's movement. A nylon ring 100 is secured on the outside of the forward end of the smaller connecting tube 93 as by means of pins 101, and said ring 100 rides inside the larger tube 91 for centering the smaller tube 93 therein. The nylon ring 100 insures quietness of operation and long wear.

The screw 90 and nut 92 here shown are of the type known to the trade as a "Roton" screw and nut. The nut is made in two annular parts as shown (see FIGURES 22 and 23). Interposed between the screw and the nut is a cage 102 in the apertures 103 of which are disposed rollers 104 (see also FIGURES 24–26) which travel in the grooves of the screw 90 to move the nut longitudinally on the screw. The rollers 104 also maintain the parts of the nut in assembly. Such a nut has the more or less unique characteristic of being advanced or retracted during normal operation of the screw until an obstruction, such as the forward limit stop pin 105 or the rearward limit stop pin 106, is reached, whereupon slippage occurs and the nut simply idles on the screw even though the screw continues to rotate. Shoulders 107 on the opposite ends of the cage engage the pins 105, 106 respectively to positively prevent any movement of the nut. While I have shown a "Roton" screw and nut in the particular embodiment of the invention herein disclosed, it will be understood that any mechanical equivalent wherein a nut moves longitudinally on a turning screw until it meets an obstruction whereupon slippage occurs so that longitudinal movement of the nut ceases even though the screw continues to turn, will serve the purpose. This feature of the invention eliminates any necessity of providing limit switches to break the electrical circuit to the driving power when the moving parts have reached their limits of travel.

It will be seen that operation of the gear-motor A in one direction will elevate the thigh spring section 58 of the bed to a forwardly-upwardly inclined position and that the foot spring section 59 will thereby automatically be elevated to a position forwardly-downwardly inclined from the thigh spring section. The elevation of these parts will continue until the desired height is reached whereupon the circuit to gear-motor A may be manually interrupted, or until the limit of travel is reached in which the thigh spring section is inclined at an angle of approximately 55 degrees. Reverse operation of gear-motor A will similarly lower the thigh and foot spring sections until the desired height is reached or until the sections reach their lowering limit of travel to a susbtantially horizontal position.

*Gear-motor B—head spring section*

The head spring section 57 of the bed is provided at its opposite forward sides with brackets 108 (see FIGURES 11 and 19) which are pivotally mounted at 109 on the side plates 54 and which are connected by a tubular crossbar 110. The mechanism inside the tubular sheath 111 and the tubular connecting member 112 associated with gear-motor B, may be identical to that described in connection with gear-motor A above and hence it is not shown nor described in detail here. The only difference is that the smaller connecting tube 112 is longer than tube 93 so that it will reach to its slotted pivotal connection at 113 to depending arms 114 rigidly mounted on the head spring section's tubular crossbar 110.

It will be seen that operation of the gear-motor B in one direction will elevate the head spring section 57 of the bed to a rearwardly-upwardly inclined position. Such elevation will continue until the desired height is reached whereupon the circuit to gear-motor B may be manually interrupted, or until the limit of travel is reached wherein the head spring is inclined at an angle of approximately 60 degrees. Reverse operation of gear-motor B will similarly lower the head spring section until the desired angle of inclination is reached or until this section reaches its lowering limit of travel to a substantially horizontal position.

*Gear-motor C—bed elevation*

The mechanism associated with gear-motor C for raising and lowering the entire bed, regardless of the positions of the spring sections, is best illustrated in FIGURES 12, 18 and 27–34. An elongated housing generally designated 115, here shown of downwardly opening channel bar construction, is secured at one end to the transverse angle bar 89 of the base frame 51 by means of bolts 116 (see FIGURE 18) passing downwardly through lugs 117 on the housing 115 and through the angle bar 89, said bolts having nuts threaded on their lower ends. The other end of the housing 115 is similarly secured to a transverse angle bar 118 (see FIGURES 18, 27 and 28) on the base frame 51 by means of bolts 119 passing downwardly through lugs 120 on the housing 115 and through the angle bar 118, said bolts having nuts 121 threaded on their lower ends.

Figure 18:
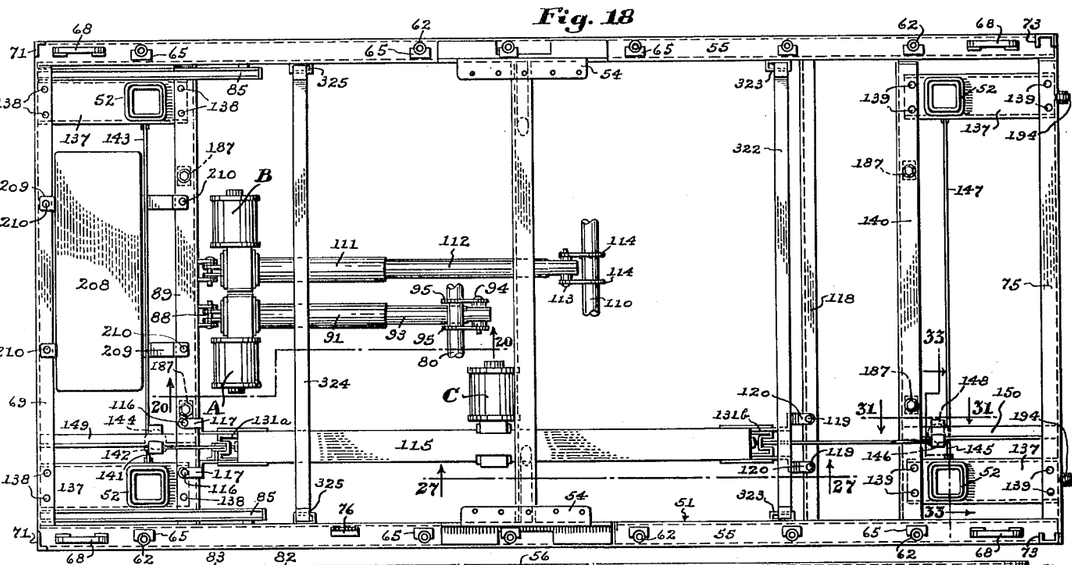
FIGURE 18 is a top plan view of the bed with the mattress, the spring sections and the outer frame paneling and trim molding omitted.
Figure 19:
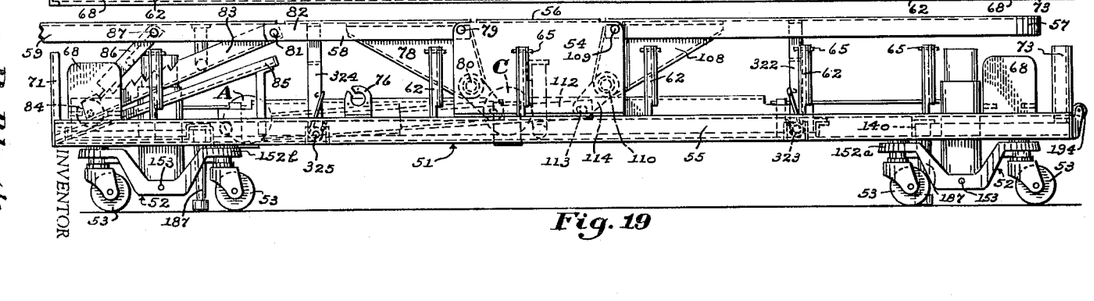
FIGURE 19 is a side elevational view of the same.
Figures 20, 21, 22, 23:
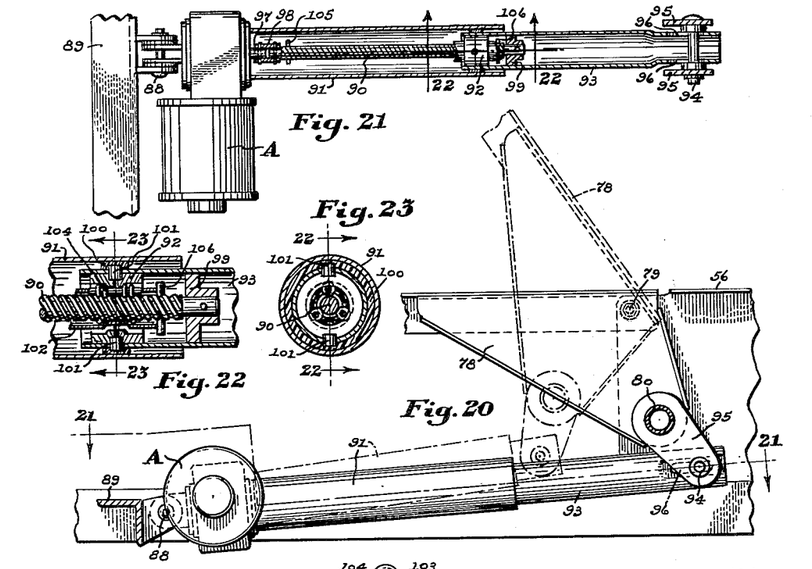
FIGURE 20 is a fragmentary vertical sectional view taken on line 20—20 of FIGURE 18 showing certain of the operating parts for the knee assembly of the bed.
FIGURE 21 is a sectional view of the same taken on line 21—21 of FIGURE 20.
FIGURE 22 is an enlarged vertical sectional view of parts thereof taken on lines 22—22 of FIGURES 21 and 23.
FIGURE 23 is a vertical sectional view taken on line 23—23 of FIGURE 22.
Figures 24, 25, 28:
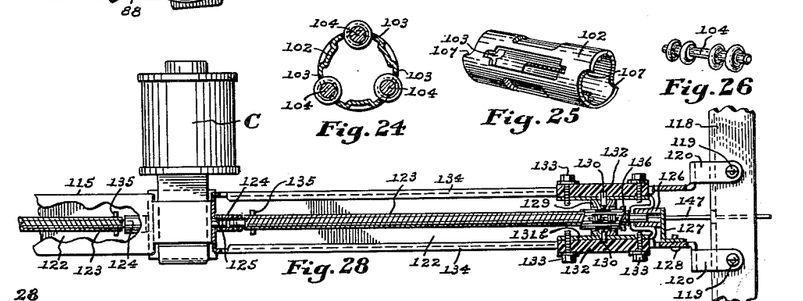
FIGURE 24 is a vertical sectional view through spaced roller elements of the mechanism and a cage therefor.
FIGURE 25 is a perspective view of said cage per se.
FIGURE 28 is a horizontal sectional view of the same taken on line 28—28 of FIGURE 27.
Figures 27, 29, 30:
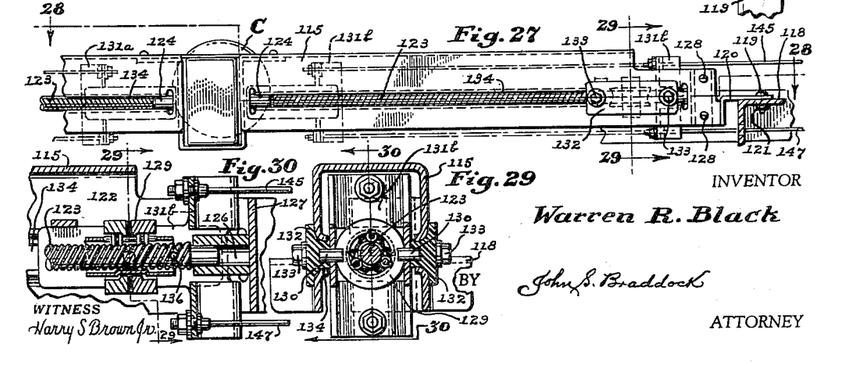
FIGURE 27 is a fragmentary vertical sectional view taken on line 27—27 of FIGURE 18 showing certain operating parts for raising and lowering the bed.
FIGURE 29 is an enlarged vertical sectional view of parts of the same taken on lines 29—29 of FIGURES 27 and 30.
FIGURE 30 is a fragmentary vertical sectional view of the same taken on line 30—30 of FIGURE 29.

The gear-motor C is mounted on the housing 115 at the housing's longitudinal center, thus dividing the housing into two compartments 122 of equal length. A pair of oppositely threaded screws 123 disposed longitudinally in said compartments 122 respectively, have their inner ends secured by couplings 124 to the driving shaft 125 of the gear-motor C, and have their outer ends journalled in bearing members 126 mounted on brackets 127 which are in turn secured to the housing 115 by means of screws 128. A travelling nut 129, here shown as of the "Roton" type previously described, is mounted for longitudinal movement on each of the "Roton" screws 123. The nuts 129 are non-rotatably mounted by means of pins 130 in sheet-metal carriages 131a at the foot end of the bed and 131b at the head end of the bed. These carriages have nylon bearing members 132 secured thereto by means of screws 133, said bearing members 132 being longitudinally slidably in ways 134 in the opposite side walls of the housing 115. It will be seen that as the gear-motor C is actuated to revolve the screws 123 in one direction or the other, the carriages 131a and 131b will simultaneously move longitudinally either toward the gear-motor C or away from it. When the "Roton" nuts 129 contact either the inner stop pins 135 or the outer stop pins 136, slipped will take place between the nuts and the screws so that the nuts will simply idle on the screws even though the screws continue their rotation, and the carriages 131a and 131b will cease moving.

To each of the two carriages 131a and 131b there is attached a pair of cables which operatively connect the carriages to the bed's four vertically adjustable supporting pedestals 52 which are located near the four corners of the bed but which are spaced inwardly from the sides and ends of the bed to provide ample foot room for attendants standing alongside the bed. These four supporting pedestals 52 are mounted in downwardly opening channel brackets 137 (see FIGURE 18) which at the foot end of the bed are secured as by rivets 138 to the foot end rail 69 and to the transverse angle bar 89 of the base frame 51, and which at the head end of the bed are secured as by rivets 139 to the head end rail 75 and to a transverse angle bar 140 on the base frame 51. At the foot end of the bed, a cable 141 (see FIGURE 18) connected to carriage 131a passes over a sheave 142 and is operatively connected to the supporting pedestal 52 at the left hand side of the bed, and a cable 143 connected to carriage 131a passes around a sheave 144 and is operatively connected to the supporting pedestal 52 at the right hand side of the bed. Similarly, at the head end of the bed, a cable 145 (see FIGURES 18, 27 and 30–34) connected to carriage 131b passes over a sheave 146 and is operativly connected to the supporting pedestal 52 at the left hand side of the bed, and a cable 147 connected to carriage 131b passes around a sheave 148 and is operatively connected to the supporting pedestal 52 at the right hand side of the bed. The sheaves 142 and 144 at the foot end of the bed are mounted on an angle bar 149 secured as by welding to the base frame 51, and the sheaves 146 and 148 at the head end of the bed are mounted on an angle bar 150 also secured as by welding to the base frame 51.

The supporting pedestals 52 are substantially identical in construction; hence only one of them—the one at the left hand side of the head end of the bed—is herein described in detail, and is illustrated in FIGURES 31–34. This supporting pedestal comprises three telescoping sections of cross-sectionally square tubing, which provides much greater stability than would be possible with round tubing. These sections are extensible and collapsible to vary the overall height of the pedestal. The lower and innermost section 151 has a caster truck 152 pivotally mounted at 153 on the lower end thereof and provided with two swivel casters 53. The caster truck 152 has a front arm 152a extending upwardly from the lower end of section 151 and then forwardly, and a rear arm 152b extending upwardly from the lower end of section 151 and then rearwardly. The casters 53 are mounted on the forwardly and rearwardly extending portions of these arms 152a and 152b. This construction increases the working distance between the bracket 137 and the caster truck 152. The arrangement of casters on the four bed-supporting pedestals also permits rocking movement of the caster trucks to compensate for uneven floors and thus provides an exceptionally smooth "ride" when the bed is wheeled about for any reason, and which might be with a patient in the bed. The intermediate section 154 of the supporting pedestal has a cable guide here shown as a pulley 155 mounted in its lower end and another cable guide or pulley 156 mounted in its upper end. The upper and outermost telescoping section 157 of the supporting pedestal has a cable guide or pulley 158 mounted at its lower end, and this upper section 157 is secured as by welding to the adjacent bracket 137 on the base frame 51 of the bed.

Figures 31, 32, 33, 34:
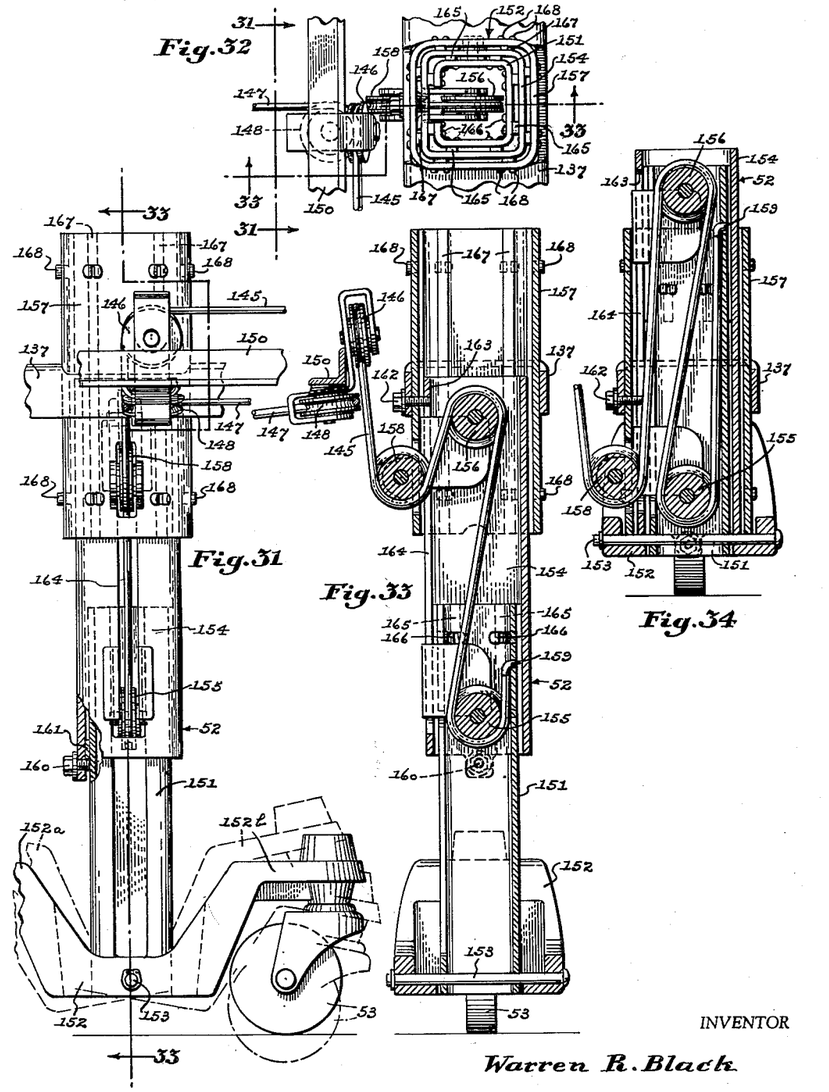
FIGURE 31 is an enlarged fragmentary side elevational view, with portions broken away, of one of the vertically adjustable supporting pedestals of the bed, the pedestal as here shown being extended to near maximum height, and this view being as seen from the line 31—31 of FIGURE 18.
FIGURE 32 is a fragmentary top plan view of said supporting pedestal.
FIGURE 33 is a vertical sectional view through said supporting pedestal taken on lines 33—33 of FIGURES 18, 31 and 32.
FIGURE 34 is a vertical sectional view similar to FIGURE 33 and showing the supporting pedestal telescoped to minimum height.
Figure 35:
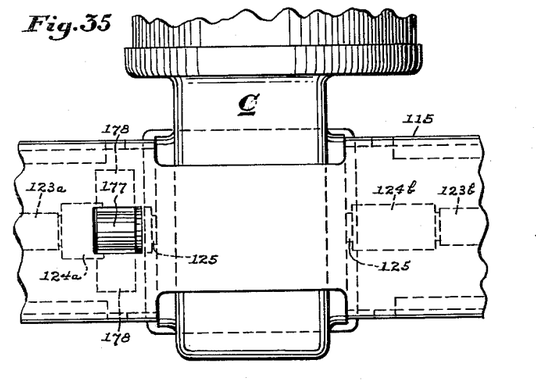
FIGURE 35 is a greatly enlarged, fragmentary top plan view, similar to the left hand end of FIGURE 28, and showing a modification wherein a braking device is associated with the operating mechanism which raises and lowers the bed.
Figure 36:
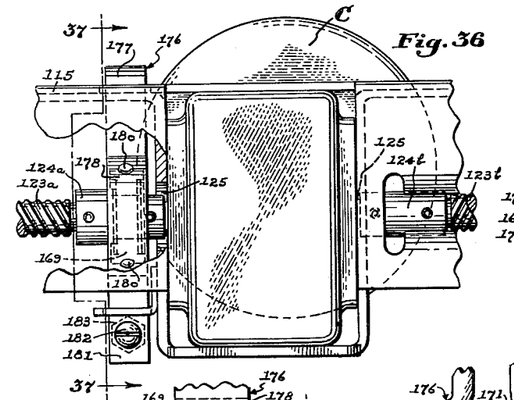
FIGURE 36 is a fragmentary side elevational view of said modification.
Figure 37:
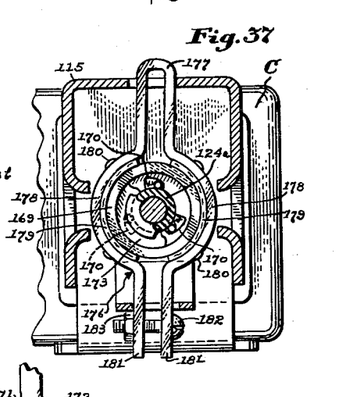
FIGURE 37 is a vertical sectional view of the same taken on line 37—37 of FIGURE 36, the parts being here shown in the positions which they occupy during lowering movement of the bed.
Figure 38:
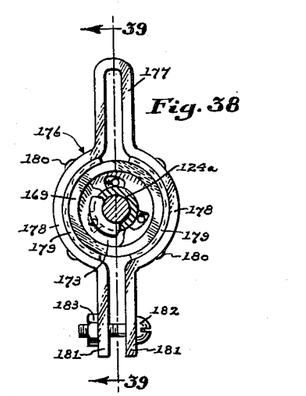
FIGURE 38 illustrates certain of the parts shown in FIGURE 37 in the positions which they occupy during raising movement of the bed.
Figure 39:
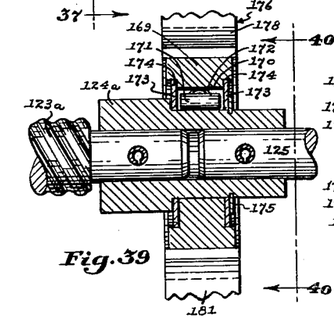
FIGURE 39 is a greatly enlarged, fragmentary vertical sectional view of parts of the braking modification, taken on line 39—39 of FIGURE 38.
Figure 40:
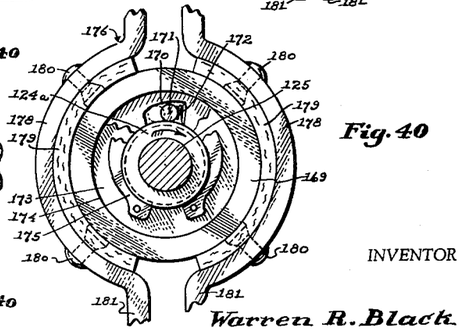
FIGURE 40 is a fragmentary, vertical sectional view of the same taken on line 40—40 of FIGURE 39.

Cable 145, after passing over sheave 146, passes downwardly around pulley 158, thence upwardly and over pulley 156, thence downwardly around pulley 155, and finally upwardly to its point of attachment at 159 to the inner wall of the lower telescoping section 151 near the upper end thereof.

It will readily be seen that when gear-motor C is actuated to move the carriages 131a and 131b inwardly toward said motor, cable 145 will be taken up inside the housing 115, with the result that pulleys 158, 156 and 155 will all be elevated from their positions seen in FIGURE 34 to their positions seen in FIGURES 31 and 33 or to intermediate positions, and the telescoping pedestal sections may thus be extended to the desired height. It will also readily be seen that cables 141, 143 and 147 will be moved simultaneously with and correspondingly to the movement of cable 145 so that all four of the supporting pedestals are extended simultaneously the same distance to adjust the base frame 51 and the bed parts carried thereby to the desired height. When it is desired to lower the bed from an elevated position, the direction of gear-motor C is reversed so that carriages 131a and 131b move outwardly away from said motor and cables 141, 143, 145 and 147 are relaxed to permit the bed to descend to the desired position. When the nuts 129 contact the "up" stop pins 135 or the "down" stop pins 136, the horizontal movement of the carriages 131a and 131b will be stopped as previously described, and the vertical movement of the bed will be limited to a maximum or a minimum of elevation even though gear-motor C continues to turn the screws 123.

While the overall maximum elevation of the bed is limited by the "up" stop pins 135 on the screws 123 as above described, means are also provided for checking the upward movement of the telescoping section 154 relative to the lower section 151, and also for checking the upward movement of the upper section 157 relative to the intermediate telescoping section 154. Such means are necessary lest more than half the lifting travel of the cable 145 (see FIGURES 31 and 33) be applied to extend the section 154 relative to the section 151 or to extend the section 157 relative to the section 154, in either of which cases the parts would become separated. These checking means comprise a stop screw 160 (see FIGURE 31) on the intermediate section 154 adapted to contact a stop 161 on the lower section 151, and another stop screw 162 (see FIGURE 33) on the upper section 157 adapted to contact a stop 163 at the upper end of the slot 164 in the intermediate member 154, through which slot the cable passes.

Nylon wear strips 165 are interposed between the lower section 151 and the intermediate section 154 of the telescoping parts, said strips 165 having studs 166 molded thereon which project through apertures in the walls of the lower member 151 to secure the strips in position. Similar nylon strips 167 are interposed between the intermediate section 154 and the upper section 157, said strips 167 having studs 168 molded thereon which project through apertures in the walls of the upper member 157 to secure these strips in position. The nylon wear strips 165 and 167 reduce the friction between the telescoping sections and also provide for noiseless operation and long wear of the parts.

The bed elevating mechanism is very smooth in operation because friction between the moving parts has been reduced to a minimum wherever possible. This is desirable because it results in quiet operation and long wear.

However, because of this smoothness of operation the bed, when it is being lowered, may have a tendency to descend beyond the point at which the gear-motor C is shut off to stop the descending movement. To overcome this tendency, there may be provided a braking device such as is illustrated in the modified form of the invention shown in FIGURES 35–40. In these views, gear-motor C is shown mounted on the housing 115 and the driving shaft 125 of the gear-motor is shown coupled to the right-hand screw 123b by means of a coupling member 124b, while the left-hand screw 123a is coupled to the driving shaft 125 of the gear-motor by means of a shouldered annular coupling member 124a. An annular braking member 169 is rotatably mounted on the reduced part of the coupling member 124a adjacent the latter's shoulder. The braking member 169 has a plurality of tapered cavities 170 therein adjacent the coupling member 124a, there being three such cavities 170 as shown. In each tapered cavity there is a roll 171 and a spring 172 which urges the roll 171 toward the smaller or tapered end of the cavity. A pair of washers 173 is seated in a pair of recesses 174 in the opposite faces of the braking member 169 for retaining the rolls 171 and springs 172 in the cavities 170, and a lock ring 175 maintains these parts in assembly. A clamping member generally designated 176 is formed from a metal bar bent to form an upper bight portion 177, complementary semicircular middle portions 178 encircling the braking member 169 and having semicircular brake shoes 179 of leather or the like secured therein by means of rivets 180, and spaced lower clamping arms 181 having an adjustment screw 182 passing through aligned apertures in said arms 181 and provided with a nut 183 threaded thereon. The bight portion 177 of the clamping member 176 extends through a slot 184 in the top wall of the housing 115, and the clamping arms 181 extend through a slot 185 in an angle bracket 186 secured as by welding to the housing 115. The clamping member 176 is thus permitted very little angular movement.

The operation of the braking device is as follows. When gear-motor C's driving shaft 125 and the screws 123a and 123b are turning in a direction for raising the bed, the parts are in their positions shown in FIGURES 38 and 39 and shown in full lines in FIGURE 40. The gear-motor's drive shaft 125 and the coupling member 124a are then turning in the direction indicated by the arrow in FIGURE 40, so that the rolls 171 are moved to the wide portions of the tapered cavities 170 against the force of the weak springs 172, and the coupling member 124a turns freely within the braking member 169. However, when the direction of the gear-motor C is reversed to lower the bed, rolls 171 are moved by the movement of the coupling member 124a and by the force of the weak springs 172, into wedging engagement in the narrow ends of the tapered cavities 170, so that the braking member 169 moves with the coupling member 124a and movement of both parts is stopped by the brake shoes 179 as soon as the gear-motor C is de-energized. The amount of braking power required to effectively stop the lowering movement of the bed when the gear-motor C stops, without interfering with the normal descent of the bed, can be determined empirically and so adjusted by means of the clamping adjustment screw 182.

Figure 47:
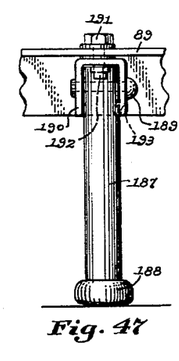
FIGURE 47 is a fragmentary end elevational view of one of the four auxiliary legs of the bed.
Figure 48:
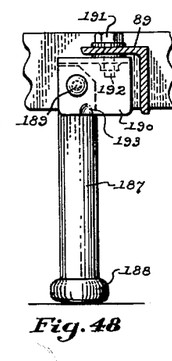
FIGURE 48 is a side elevational view of said auxiliary leg.
Figure 49:
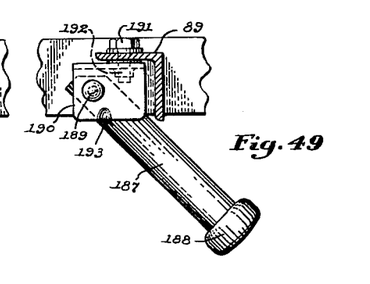
FIGURE 49 is a similar side elevational view showing the auxiliary leg in an upwardly swung inoperative position.

The bed is provided with four depending auxiliary legs 187 having rubber feet 188 which contact the floor when the bed is in its fully lowered position. These legs prevent any inadvertent rolling of the bed on the casters 53 as, for example, when a patient gets out of the bed. These legs 187 are mounted on the transverse angle bars 89 and 140 of the base frame 51. One of the legs 187 is shown in detail in FIGURES 47–49, wherein the leg 187 is secured by means of a pivot pin 189 to a bracket 190 which is rigidly connected to the angle bar 89 by means of a screw 191 and nut 192. The legs 187 can be swung upwardly to inoperative positions as indicated in FIGURE 49 in instances when it is desired to move the bed while in its lowermost position. A stop 193 formed in the bracket 190 is provided for maintaining each leg 187 in either its vertical or its upwardly swung inoperative position.

Hospital beds are frequently placed with the headboard adjacent a wall of the patient's room. In order to prevent any damage to such wall during raising and lowering of the bed, and also to insure smooth and unhampered operation of the bed, I provide rollers 194 (see FIGURES 11, 18 and 19) mounted on the head end rail 75 of the base frame 51, which rollers are adapted to ride up and down the adjacent wall during raising and lowering movements of the bed.

Figure 41:
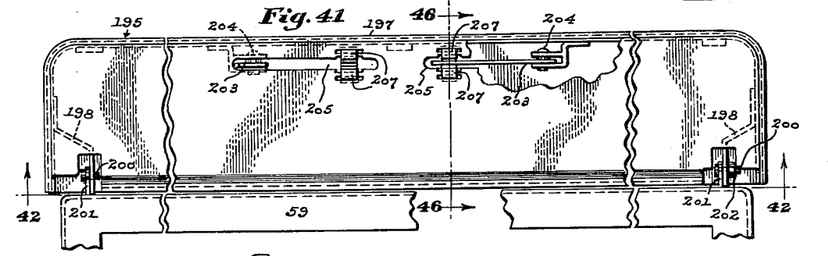
FIGURE 41 is a fragmentary top plan view of the footboard of the bed when said footboard is in a forwardly-downwardly swung, horizontal position for elongating the bed as illustrated in FIGURE 6.
Figure 42:
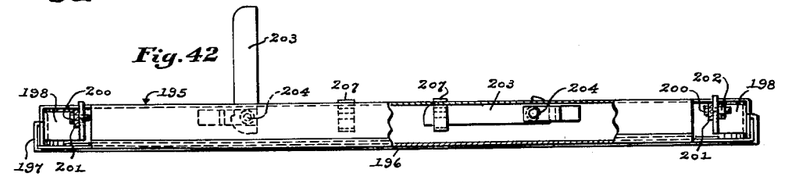
FIGURE 42 is a vertical sectional view thereof taken on line 42—42 of FIGURE 41 with a portion of the footboard broken away to better illustrate the mattress-stops mounted in the footboard.

A unique feature of the invention resides in the low footboard 195 which provides ready access to the patient from the foot of the bed. The footboard is shown in considerable detail in FIGURES 41–46. It comprises a box-like structure fabricated of sheet metal, the outer panel 196 of which is desirably vinyl-clad to match the side and end panels and the headboard of the bed, and a decorative molding 197 of aluminum or the like is applied around the top and sides of the footboard. The footboard 195 is mounted on the foot spring section 59 of the bed so that it moves with said section up and down and to inclined positions. The inside opposite ends of the footboard have brackets 198 secured thereto as by welding and provided with slots 199 through which pass pins 200 which also pass through apertures in brackets 201 on the foot spring section 59. (Pins 200 and brackets 201 are not shown in FIGURE 46, which view shows only the headboard per se.) The pin 200 shown at the left in FIGURES 41, 42 is welded to the adjacent bracket 201, whereas the pin 200 shown at the right is threaded to receive a nut 202 whereby these parts are secured in assembly.

Figure 6:
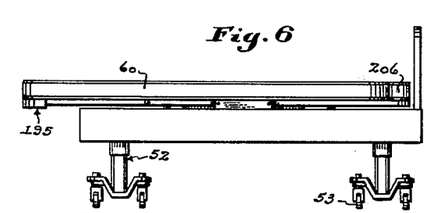
FIGURE 6 is a side elevation with the several sections in lowered or horizontal positions and with the bed extended lengthwise to accommodate a tall patient.
Figure 43:
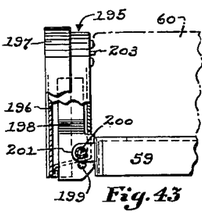
FIGURE 43 is a fragmentary side elevational view, with portions broken away, of the foot end of the bed, the footboard being here shown in its normal raised vertical position as seen in FIGURE 1.
Figures 44, 45, 46:
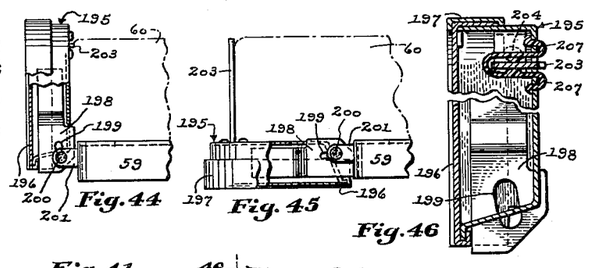
FIGURE 44 is a side elevational view similar to FIGURE 43 and showing the footboard partly raised prior to swinging it forwardly-downwardly to a horizontal position.
FIGURE 45 is a similar side elevational view showing the footboard in its forwardly-downwardly swung position for elongating the bed.
FIGURE 46 is an enlarged fragmentary vertical sectional view of the footboard per se taken on line 46—46 of FIGURE 41.

By reason of the pin and slot connections between the footboard 195 and the foot spring section 59 described above the footboard may be lifted from its normal position seen in FIGURE 43 to its position seen in FIGURE 44, and then swung forwardly-downwardly to a horizontal position as seen in FIGURE 45. Mattress-stops 203 pivotally mounted at 204 in the outer end of the footboard, may then be swung upwardly through slots 205 in the footboard, whereupon the mattress 60 may be slid forwardly against the mattress-stops 203 and a mattress extension 206 (see FIGURE 6) may be added at the head end of the bed. The bed may thus be extended by about 6 inches to accommodate patients of unusual height. Spring clips 207 are provided in the footboard for retaining the mattress-stops 203 when the latter are not in use.

Figure 4:
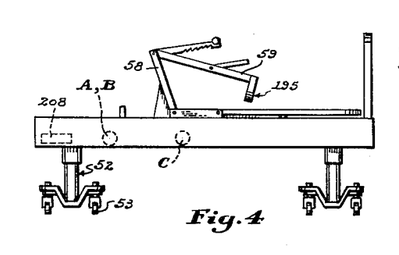
FIGURE 4 is a side elevational view of the bed with the mattress removed and with the thigh and foot spring sections collapsed rearwardly so as to give access to the bed operating mechanism located principally in the foot end of the bed.

A control box 208 (see FIGURE 18) for housing electrical components hereinafter described is mounted in the foot end of the bed by means of metal straps 209 secured as by rivets 210 to the foot end rail 69 and the transverse angle bar 89 of the base frame 51. It will be seen that by placing the control box 208 and the three gear-motors and their associated mechanisms in the foot end of the bed, these operating parts are readily accessible for servicing by simply removing the mattress 60, and collapsing the pivoted thigh and foot spring sections 58, 59 upwardly and rearwardly as seen in FIGURE 4.

Figure 50:
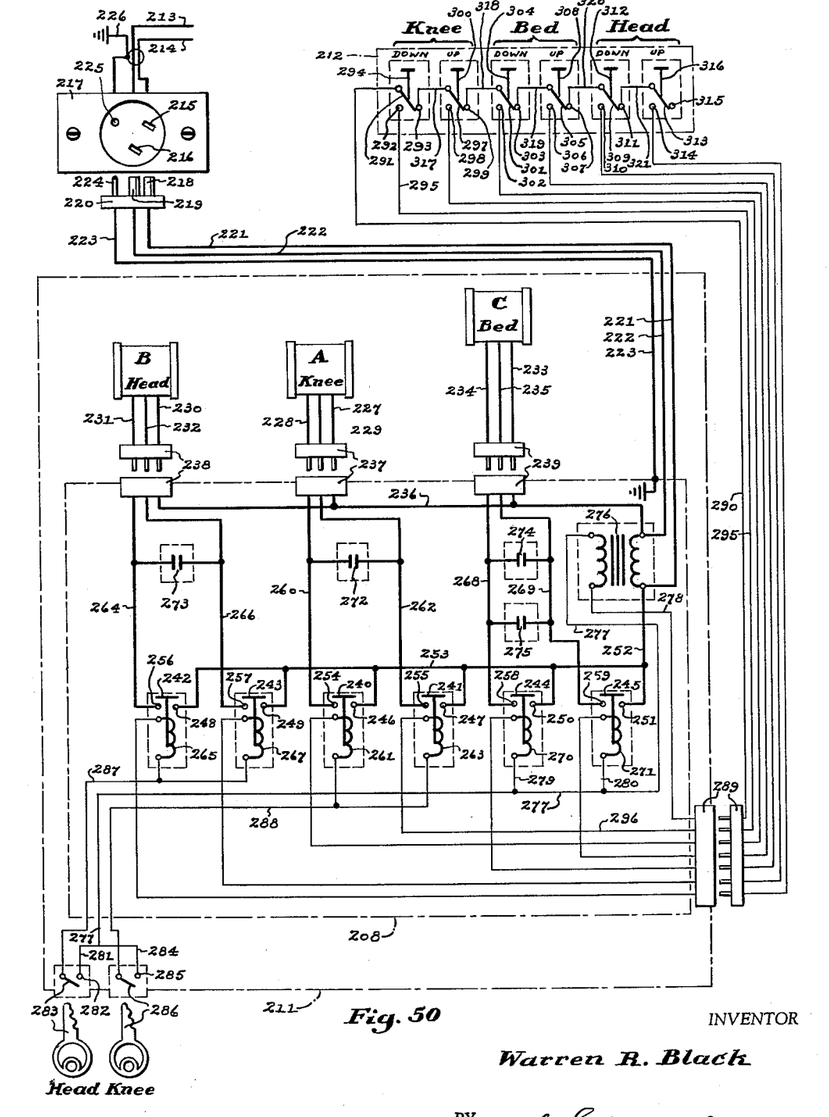
FIGURE 50 is a wiring diagram illustrating schematically the arrangement of motors, switches and other electrical equipment forming part of the motorized bed.

*Circuitry—FIGURE 50*

The wiring diagram of FIGURE 50 indicates schematically by means of broken-line rectangles the bed 211, the control box 208, and the manual control device 212, the latter being a somewhat reverse representation of the manual control device as seen in FIGURE 1a. The bed operating circuits are 110-volt and are shown in heavy lines, while the control circuits are 24-volt to insure safety and are shown in lighter lines.

110-volt alternating current is supplied to the control box 208 through wires 213, 214, through the sockets 215, 216 of a receptacle 217, through pins 218, 219 of a plug 220 and through wires 221, 222. The control box 208 is grounded for safety through wire 223, pin 224 of plug 200, socket 225 of receptacle 217, and wire 226.

Gear-motors A, B and C, being of the reversible type, have three leads each. The leads to gear-motor A are designated 227, 228 and 229; those to gear-motor B are designated 230, 231 and 232; while the leads to gear-motor C are designated 233, 234 and 235. Leads 227, 230 and 233 of the gear-motors are connected to the 110-volt supply wire 222 by wire 236 and through separable connectors 237, 238 and 239 which for the purposes of this description will be considered closed at all times.

Six relay switches are provided in the control box 208, these being designated 240 and 241 for forward and reverse operaiton of gear-motor A, 242 and 243 for forward and reverse operation of gear-motor B, and 244 and 245 for forward and reverse operation of gear-motor C. The right hand contacts of these relay switches, which contacts are designated 246, 247, 248, 249, 250 and 251 respectively are connected to the 110-volt supply wire 221 through wires 252 and 253. The left hand contacts of the relay switches, which contacts are designated 254, 255, 256, 257, 258 and 259 respectively, are connected to the gear-motors for the operation thereof as follows.

Wire 260 connects contact 254 with the lead 228 of gear-motor A, so that when coil 261 is energized to close relay switch 240, a circuit is completed through supply wire 221, wires 252 and 253, switch 240, wire 260, lead 228, gear-motor A, lead 227, wire 236 and supply wire 222, thus to drive gear-motor A in a forwardly direction to elevate the knee assembly—i.e. the thigh and foot sections of the bed. Wire 262 connects contact 255 with the lead 229 of gear-motor A, so that when coil 263 is energized to close relay switch 241, a circuit is completed through supply wire 221, wires 252 and 253, switch 241, wire 262, lead 229, gear-motor A, lead 227, wire 236 and supply wire 222, thus to drive gear-motor A in a reverse direction to lower the knee assembly of the bed.

Similarly, wire 264 connects contact 256 with the lead 231 of gear-motor B so that when the coil 265 of relay switch 242 is energized, a circuit is completed for driving gear-motor B in a forwardly direction to elevate the head section of the bed. Wire 266 connects contact 257 with the lead 232 of gear-motor B so that when coil 267 is energized gear-motor B is driven reversely to lower the head section of the bed.

In like manner, wires 268 and 269 connect contacts 258 and 259 with lead wires 234 and 235 of gear-motor C, all respectively, so that when coils 270 and 271 are individually energized gear-motor C will be driven forwardly or reversely to raise or lower the entire bed, also respectively.

A capacitor 272 is shunted between wires 260 and 262, another capacitor 273 is shunted between wires 264 and 266, and a pair of capacitors 274 and 275 are shunted between wires 268 and 269. These capacitors create phase shifts in the gear-motors to increase their starting torque, and improve the efficiency of the gear-motors.

Low-voltage current of about 24 volts is provided for the control circuitry by means of a transformer 276 the primary coil of which is connected to the 110-volt supply wires 221 and 222, and the secondary coil of which supplies 24 volt current to the control circuits through supply wires 277 and 278. Supply wire 277 is connected directly to the lower terminals of relay coils 270 and 271 which operate the bed-elevating gear-motor C, by wires 279 and 280 respectively. Supply wire 277 is also connected by wire 281 to contact 282 of a "Head" lockout switch, indicated at 283, and by wire 284 to contact 285 of a "Knee" lockout switch indicated at 286. The "Head" lockout switch 283 is connected by wire 287 to the lower terminals of relay coils 265 and 267 which operate the gear-motor B to move the head section of the bed. The "Knee" lockout switch 286 is connected by wire 288 to the lower terminals of relay coils 261 and 263 which operate the gear-motor A to move the knee assembly of the bed.

Supply wire 278 extends from the transformer 276 through a separable seven-point connector 289 to wire 290 which connects with a "Knee down" switch 291 having contacts 292 and 293 and a manual pushbutton 294 by means of which switch 291 may be moved from a spring-pressed neutral position against contact 293 to an operating position against contact 292. This completes a low-voltage circuit from transformer 276 through wire 278, connector 289, wire 290, switch 291, wire 295, connector 289, wire 296, coil 263 of relay switch 241, wire 288, switch 286 (which must, of course, have been previously closed) wire 284, and wire 277 to the other side of transformer 276. Coil 263 being thus energized, relay 241 is closed to actuage gear-motor A in a direction for lowering the knee assembly of the bed.

The other control circuits operate in the same manner as the "Knee down" circuit above described. There is a "Knee up" switch 297 having contacts 298 and 299 and a pushbutton 300, a "Bed down" switch 301 having contacts 302 and 303 and a pushbutton 304, a "Bed up" switch 305 having contacts 306 and 307 and a pushbutton 308, a "Head down" switch 309 having contacts 310 and 311 and a pushbutton 312, and a "Head up" switch 313 having contacts 314 and 315 and a pushbutton 316. When the switches are all in their neutral positions as shown, they are interconnected by a lead 317 from contact 293 to switch 297, a lead 318 from contact 299 to switch 301, a lead 319 from contact 303 to switch 305, a lead 320 from contact 307 to switch 309, and a lead 321 from contact 311 to switch 313. Current is thus available to any one of the switches to complete its circuit, while at the same time the arrangement makes is impossible to complete more than one control circuit at a time which would be undesirable.

The "Head" and "Knee" lockout switches 283 and 286 would in many situations remain closed so that by means of the manual control the patient could make any of the various motorized bed adjustments at will, thus saving a great deal of time for nurses and other attendants. In other situations, however, it is necessary or desirable that the head section or the knee assembly, or both, remain in certain fixed positions of adjustment. In these latter situations a doctor or nurse could lock out the head section or the knee section, or both, by opening the switches 283 and/or 286 with a key thus rendering the head and knee switches in the manual control inoperable. If it were desirable to eliminate all motorized operation of the bed by the patient, including the bed elevation adjustment, the manual control could simply be removed from the bed.

Figure 7:
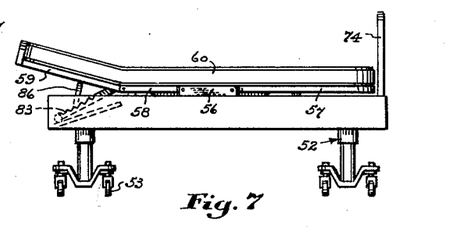
FIGURE 7 is a side elevation with the foot section inclined forwardly-upwardly.
Figure 8:
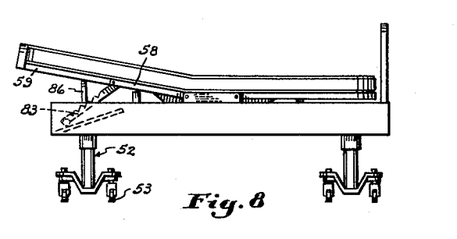
FIGURE 8 is a side elevation with the knee assembly inclined forwardly-upwardly.
Figure 9:
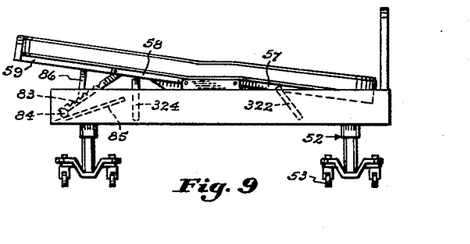
FIGURE 9 is a side elevation with the head section inclined rearwardly-downwardly and with the knee assembly inclined forwardly-upwardly, this being known as the "Trendelenburg" position of the bed.
Figure 10:
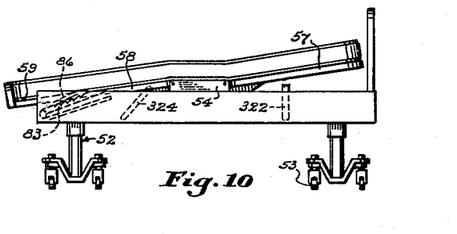
FIGURE 10 is a side elevation with the head section inclined rearwardly-upwardly and with the knee assembly inclined forwardly-downwardly (reverse "Trendelenburg")

Provision is made in the bed for certain adjustments thereof to special positions to meet special conditions. In FIGURE 7 the foot section 59 has been moved to a forwardly-upwardly inclined position by engaging arms 86 in a higher set of teeth in the toothed arms 83. In FIGURE 8, both the thigh section 58 and the foot section 59 are in forwardly-upwardly inclined position. In FIGURE 9, which shows the "Trendelenburg" position, the foot and thigh sections 58 and 59 are inclined forwardly-upwardly, while the head section 57 is inclined rearwardly-downwardly. Such inclination of the head section is accomplished by swinging forwardly a supporting crossbar 322 (see FIGURES 18 and 19) pivotally mounted at 323 on the base frame 51, this movement being facilitated by the slotted pivotal connection at 113 of tube 112 to arms 114 (see FIGURE 19). In FIGURE 10, which shows the "reverse Trendelenburg" position, the head section 57 is inclined rearwardly-upwardly, while the foot and thigh sections 58, 59 are inclined forwardly-downwardly. Such inclination of the foot and thigh sections is accomplished by disengaging arms 86 from the toothed arms 83 and by swinging rearwardly a supporting crossbar 324 (see FIGURES 18 and 19) pivotally mounted at 325 on the base frame 51, this movement being facilitated by the slotted pivotal connection at 96 of tube 93 to arms 95 (see FIGURES 20 and 21).

It will thus be seen that the invention provides a hospital bed possessing many novel features of utility and with such versatility of adjustment as to meet all requirements of patient comfort and welfare, a bed which is characterized by simplicity in construction and by efficiency and reliability in operation. The invention being intended to be pointed out in the claims which follow, it will be understood that it is not to be limited to, or by, details of construction of the particular embodiments thereof illustrated by the drawings or hereinbefore described.

I claim:

1. In a hospital bed: a base frame; four vertically extensible and collapsible supporting pedestals for said base frame whereby the base frame may be raised or lowered; cable-operated means in the four supporting pedestals having cables connected thereto extending exteriorly of the pedestals whereby when the cables are simultaneously taken up exteriorly of the pedestals the base frame is elevated and when the cables are simultaneously paid out into the pedestals the base frame is permitted to descend; an elongated housing mounted on the base frame in forwardly-rearwardly extending disposition; a reversible gear-motor mounted on the housing at the approximate longitudinal center thereof and dividing the interior of the housing into two compartments; a pair of oppositely threaded screws disposed in said compartments respectively and having their inner ends operatively connected to the gear-motor; a pair of travelling nuts mounted on said screws; a pair of carriages non-rotatably mounted on the nuts and having bearing members longitudinally movable in ways in said housing, the cables connected to the pairs of pedestals at opposite ends of the bed being connected to said carriages respectively whereby when the gear-motor turns the screws to move the nuts and the carriages inwardly or outwardly the cables are correspondingly taken up or paid out to raise or lower said base frame.

2. A hospital bed according to claim 1 in which a braking device is provided for halting the descent of the base frame when the gear-motor is de-energized, said braking device comprising: an annular coupling member coupling one of said screws to the driving shaft of the gear-motor; an annular braking member rotatably mounted on said coupling member and provided with a plurality of tapered cavities therein adjacent said coupling member; a roll in each cavity; a clamping member having complementary semicircular portions with semicircular brake shoes secured therein, said brake shoes engaging the outer surface of said braking member to exert a braking force thereon; means on the clamping member associated with housing for preventing rotation of the clamping member; spring means in the braking member's cavities urging the rolls into the smaller tapered ends of the cavities, said rolls being moved into the larger ends of the cavities against said spring means by the coupling member when the latter is rotated in a direction for elevating the bed whereby the coupling member turns freely in the braking member during such rotation, and said rolls being moved by said spring means into the smaller ends of the cavities to engage the coupling member with the braking member when the coupling member is urged in a direction for lowering the bed.

3. A hospital bed according to claim 1 in which the clamping member has spaced arms extending from its semicircular portions, and an adjustment screw passing through said arms for adjusting the tension on said semicircular portions and the force applied by said braking shoes against said braking members.

4. In a motorized hospital bed: three reversible gear-motors mounted on the bed for operating bed elevating mechanism, head section mechanism, and knee section mechanism; a supply source of electric current; two operating circuits for each gear-motor, said circuits including relay switches whereby when one or the other of said relay switches is closed the gear-motor is energized for operation in one direction or the other, and said circuits including a capacitor shunted between the leads from the relay switches to the gear-motor; a control circuit for each of the six relay switches; a transformer connected to the supply source for supplying low-voltage current to the control circuits; a remote manual control device adapted to be held in a hand of the bed occupant, said device including six manually operable switches each adapted to close a control circuit for closing one of said relay switches to energize one of said gear-motors for operation in one direction or the other; a "Head" lockout switch included in the control circuits for the head section relays and a "Knee" lockout switch included in the control circuits for the knee section relays, said lockout switches being mounted on the bed in positions wherein they are readily accessible to an attendant but normally inaccessible to the bed occupant; and a cable containing the leads from the transformer to the manual control device and from the manual control device to the relays, said cable including a separable connector mounted in a side wall of the bed.

5. In a hospital bed: a base frame having mounted thereon a fixed seat spring section and a movable spring section pivotally connected to one end of the fixed seat spring section; brackets depending from opposite sides of the movable spring section adjacent its pivotal connection to the seat spring section; a crossbar connecting said brackets; a depending arm rigidly mounted on the crossbar; a transverse bar extending across the base frame spacedly from said depending arm; a reversible gear-motor pivotally mounted on said transverse bar; a screw operatively connected to said gear-motor and extending toward said depending arm; a travelling nut on said screw; and a connecting member having one end thereof mounted on said nut and the other end thereof pivotally connected to the depending arm on said crossbar, said screw being enclosed in a tubular sheath secured to the gear-motor and said connecting member being tubular and telescoping within said tubular sheath.

6. In a hospital bed: a base frame having mounted thereon a fixed seat spring section and a movable spring section pivotally connected to one end of the fixed seat spring section; brackets depending from opposite sides of the moavble spring section adjacent its pivotal connection to the seat spring section; a crossbar connecting said brackets; a depending arm rigidly mounted on the crossbar; a transverse bar extending across the base frame spacedly from said depending arm; a reversible gear-motor pivotally mounted on said transverse bar; a screw operatively connected to said gear-motor and extending toward said depending arm; a travelling nut on said screw; and a connecting member having one end thereof mounted on said nut and the other end thereof pivotally connected to the depending arm on said crossbar, said screw being provided with stops at the opposite ends thereof and said nut having means associated therewith to provide for slippage thereof when the nut contacts said stops whereupon the nut idles on the screw and ceases its longitudinal movement thereon even though the screw continues to rotate.

7. In a hospital bed: a base frame having mounted thereon a fixed seat spring section and a movable spring section pivotally connected to one end of the fixed seat spring section; brackets depending from opposite sides of the movable spring section adjacent its pivotal connection to the seat spring section; a crossbar connecting said brackets; a depending arm rigidly mounted on the crossbar; a transverse bar extending across the base frame spacedly from said depending arm; a reversible gear-motor pivotally mounted on said transverse bar; a screw operatively connected to said gear-motor and extending toward said depending arm; a travelling nut on said screw; and a connecting member having one end thereof mounted on said nut and the other end thereof pivotally connected to the depending arm on said crossbar, said movable spring section being supported in a horizontal position by means of a supporting crossbar pivotally mounted on the base frame, said crossbar being swingable to a lower position whereby the movable spring section may be lowered to a position of downward inclination from said fixed spring section.

References Cited by the Examiner

UNITED STATES PATENTS

| | | | |
|---|---|---|---|
| 469,117 | 9/92 | Bowman | 248—345.1 |
| 515,149 | 2/94 | Kastor | 273—5 |
| 1,440,783 | 1/23 | Kiley | 248—345.1 |
| 1,666,139 | 4/28 | Johnson | 16—48 X |
| 1,857,930 | 5/32 | Altorfer | 16—19 |
| 2,373,017 | 4/45 | Deckert | 5—66 |
| 2,532,705 | 12/50 | Freund | 5—80 |
| 2,631,300 | 3/53 | Murry | 5—69 |
| 2,681,454 | 6/54 | Tallman | 5—63 |
| 2,734,202 | 2/56 | Entwistle | 5—53 |
| 2,740,133 | 4/56 | Fox | 5—53 |
| 2,759,773 | 8/56 | Wilmer et al. | 312—341 |
| 2,802,219 | 8/57 | Travis | 5—67 X |
| 2,807,174 | 9/57 | Helsel | 5—68 X |
| 2,827,641 | 3/58 | Reichert et al. | 5—63 |
| 2,831,200 | 4/58 | Olsen | 5—69 |
| 2,837,751 | 6/58 | McCall | 5—80 |
| 2,847,092 | 8/58 | Noyes et al. | 188—5 |
| 2,856,613 | 10/58 | Mandelko et al. | 5—68 |
| 2,857,776 | 10/58 | Williams et al. | 74—424.8 |
| 2,912,704 | 11/59 | Burst | 5—69 |
| 2,913,740 | 11/59 | Eldridge | 5—317 |
| 2,918,143 | 12/59 | Shaffer | 187—9 |
| 2,941,626 | 6/60 | Heiden | 188—5 |
| 2,957,187 | 10/60 | Raia | 2—317 |
| 2,966,956 | 1/61 | Campbell et al. | 182—141 X |
| 3,005,999 | 10/61 | Brown | 5—67 |
| 3,012,253 | 12/61 | Reichert | 5—68 |
| 3,089,150 | 5/63 | Briggs et al. | 5—68 |

FOREIGN PATENTS

| | | |
|---|---|---|
| 4,822 | 1877 | Great Britain. |
| 839,310 | 6/60 | Great Britain. |
| 146,156 | 7/54 | Sweden. |

OTHER REFERENCES

Montgomery Ward Spring and Summer Catalogue, 1961, page 1050.

FRANK B. SHERRY, *Primary Examiner.*

GEORGE L. BREHM, *Examiner.*